(12) United States Patent
Wang et al.

(10) Patent No.: US 9,947,082 B2
(45) Date of Patent: Apr. 17, 2018

(54) IMAGE COMPENSATION METHOD AND APPARATUS

(71) Applicant: BOE Technology Group Co., Ltd., Beijing (CN)

(72) Inventors: Hong Wang, Beijing (CN); Chengqi Zhou, Beijing (CN); Shou Li, Beijing (CN); Jung Chul Gyu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 215 days.

(21) Appl. No.: 15/135,859

(22) Filed: Apr. 22, 2016

(65) Prior Publication Data

US 2017/0032498 A1 Feb. 2, 2017

(30) Foreign Application Priority Data

Jul. 27, 2015 (CN) .......................... 2015 1 0446880

(51) Int. Cl.
*G09G 5/02* (2006.01)
*G06T 5/00* (2006.01)
(Continued)

(52) U.S. Cl.
CPC .............. *G06T 5/001* (2013.01); *G06T 5/008* (2013.01); *G06T 5/50* (2013.01); *G06T 7/20* (2013.01); *G06T 2207/10016* (2013.01)

(58) Field of Classification Search
CPC .............................. G09G 5/02; G06T 11/001
(Continued)

(56) References Cited

U.S. PATENT DOCUMENTS 4,663,665 A 5/1987 Tanaka et al.
7,139,019 B2 11/2006 Kondo et al.
(Continued)

FOREIGN PATENT DOCUMENTS

CN 86100610 A 7/1986
CN 1465034 A 12/2003
(Continued)

OTHER PUBLICATIONS

First Office Action from Chinese Patent Application No. 201510446880.X, dated Oct. 10, 2017, 15 pages.
(Continued)

*Primary Examiner* — Jin Ge
(74) *Attorney, Agent, or Firm* — Westman, Champlin & Koehler, P.A.

(57) ABSTRACT

An image compensation method and apparatus is provided. The method may include: determining, as the second brightness value, a brightness value for which a SAD corresponding to the brightness value and the first brightness value is the minimum, in brightness parameters of a second image displayed at a second time; determining a membership degree corresponding to a target SAD; determining a motion compensation parameter corresponding to a first coordinate and a median frame interpolation parameter corresponding to the first coordinate; determining a brightness compensation parameter corresponding to the first coordinate based on the membership degree corresponding to the target SAD, the motion compensation parameter corresponding to the first coordinate and the median frame interpolation parameter corresponding to the first coordinate; performing an image compensation so as to display a compensated image at a time between the second time and the first time based on the brightness compensation parameter corresponding to the first coordinate.

10 Claims, 5 Drawing Sheets

(51) Int. Cl.
*G06T 7/20* (2017.01)
*G06T 5/50* (2006.01)

(58) Field of Classification Search
USPC .......................................................... 345/589
See application file for complete search history.

(56) References Cited

U.S. PATENT DOCUMENTS

| | | |
|---|---|---|
| 8,270,491 B2 | 9/2012 | Kervec et al. |
| 2007/0217507 A1* | 9/2007 | Kazui ................... H04N 19/139 375/240.03 |
| 2009/0279608 A1* | 11/2009 | Jeon ..................... H04N 19/597 375/240.16 |
| 2010/0245664 A1 | 9/2010 | Wu et al. |
| 2010/0290532 A1* | 11/2010 | Yamamoto ........... H04N 19/176 375/240.16 |
| 2011/0176614 A1* | 7/2011 | Sato ..................... H04N 19/105 375/240.16 |
| 2014/0010305 A1* | 1/2014 | Mironovich ..... H04N 19/00763 375/240.16 |
| 2014/0139627 A1* | 5/2014 | Chen ................... H04N 13/0048 348/43 |
| 2014/0161185 A1* | 6/2014 | Takeda ................ H04N 19/463 375/240.16 |

FOREIGN PATENT DOCUMENTS

| | | |
|---|---|---|
| CN | 101283598 A | 10/2008 |
| EP | 0580225 A2 | 1/1994 |

OTHER PUBLICATIONS

Lu et al., "Motion-compensated Frame Interpolation Based on Weighted Motion Estimation and Vector Segmentation", Acta Automatica Sinica, dated May 2015, 8 pages.

* cited by examiner

IMAGE COMPENSATION METHOD AND APPARATUS

CROSS-REFERENCE TO RELATED APPLICATION

This application claims priority to Chinese Application No. 201510446880.X, filed on Jul. 27, 2015, the contents of which are incorporated herein by reference in their entirety.

TECHNICAL FIELD

The present application relates to a field of display, in particular, to an image compensation method and apparatus.

BACKGROUND

A display apparatus may include a display screen consisting of a plurality of pixels and a controller which can control the brightness of the pixels according to preset brightness parameters for displaying images. Brightness parameters for a pixel may include a coordinate of the pixel on the display screen and its brightness value, in which the coordinate and the brightness value of the pixel correspond with each other. The controller may adjust the brightness of the pixels in sequence according to the brightness parameters chronologically, which may enable the display screen to display images in series.

In the prior art, effects on displaying continuous images for the display screen can be improved by compensating the continuous images using a motion compensation method. For example, first of all, a brightness value in brightness parameters of a second images displayed at a second time, for which a Sum of Absolute Difference (SAD) corresponding to the brightness value and a first brightness value is the minimum, can be determined as a second brightness value according to a formula for determining a SAD, wherein the first brightness value is a brightness value in brightness parameters of a first image displayed at a first time, and the second time is a time previous the first time. Then, one of the first brightness value and the second brightness value is randomly selected as a compensation brightness value. A midpoint coordinate between a coordinate corresponding to the first brightness value in the brightness parameters at the first time and a coordinate corresponding to the second brightness value in the brightness parameters at the second time is used as a coordinate corresponding to the compensation brightness value. The compensation brightness value and the coordinate corresponding to it are used as a motion compensation parameter. Finally, at a midpoint time of the first time and the second time, the display apparatus may control the brightness of the pixel located at the coordinate corresponding to the compensation brightness value to be equal to the compensation brightness value according to the motion compensation parameter, such that an image displayed at the midpoint time is associated with the images displayed at the first time and the second time both. The image displayed at the midpoint time is a transition image between the images displayed at the first time and the second time, compensating the images displayed at the first time and the second time. It should be noted that SAD can indicate a similarity between two brightness values, in which the smaller a SAD is, the greater the similarity becomes.

However, if the similarity between images displayed at the first time and the second time is great, there may be a plenty of brightness values in the brightness parameters at the second time, for which SADs corresponding to each of the plenty of brightness values and the first brightness value are the minimum. In this case, it is required to select one from the plenty of brightness values as the second brightness value randomly. Thus, there may an error in the coordinate corresponding to the second brightness value, leading to an error in the motion compensation parameter, which may further cause a poor image compensation performance.

SUMMARY

The present application provides an image compensation method and apparatus.

According to a first aspect of embodiments of the present disclosure, an image compensation method is provided, and the method may include:

determining, as a second brightness value, a brightness value for which a Sum of Absolute Difference (SAD) corresponding to the brightness value and a first brightness value is the minimum, in brightness parameters of a second image displayed at a second time, the first brightness value is a brightness value in brightness parameters of a first image displayed at a first time and the second time is a time previous the first time;

determining a membership degree corresponding to a target SAD, wherein the target SAD is a SAD corresponding to the first brightness value and the second brightness value;

determining a motion compensation parameter corresponding to a first coordinate and a median frame interpolation parameter corresponding to the first coordinate, wherein the first coordinate is a coordinate corresponding to the first brightness value in the brightness parameters at the first time;

determining a brightness compensation parameter corresponding to the first coordinate based on the membership degree corresponding to the target SAD, the motion compensation parameter corresponding to the first coordinate and the median frame interpolation parameter corresponding to the first coordinate;

performing an image compensation so as to display a compensated image at a time between the second time and the first time based on the brightness compensation parameter corresponding to the first coordinate;

wherein the brightness compensation parameter is determined as follows:

$$f_{ins}(i,j)=u*f_{move}(i,j)+(1-u)*f_{int}(i,j),$$

u indicates the membership degree corresponding to the target SAD, (i, j) indicates the first coordinate, $f_{ins}(i, j)$ indicates the brightness compensation parameter corresponding to the first coordinate, $f_{move}(i, j)$ indicates the motion compensation parameter corresponding to the first coordinate; and $f_{int}(i, j)$ indicates the median frame interpolation parameter corresponding to the first coordinate.

Preferably, determining the membership degree corresponding to a target SAD may comprise:

comparing the target SAD with preset threshold parameters;

determining the membership degree corresponding to the target SAD according to the comparison result;

wherein the membership degree corresponding to the target SAD is determined as follows:

$$u = \begin{cases} 0 & (SAD \leq a \| SAD \geq f) \\ \dfrac{[SAD-a]^2}{(b-a)(c-a)} & (a \leq SAD \leq b) \\ 1 - \dfrac{[SAD-c]^2}{(c-b)(c-a)} & (b \leq SAD \leq c) \\ 1 & (c \leq SAD \leq d) \\ \dfrac{[a-SAD]^2}{(b-a)(c-a)} & (d \leq SAD \leq e) \\ 1 - \dfrac{[c-SAD]^2}{(c-b)(c-a)} & (e \leq SAD \leq f) \end{cases},$$

wherein u indicates the membership degree corresponding to the target SAD; a, b, c, d, e and f indicate the preset threshold parameters respectively, in which a<b<c<d<e<f; and SAD≤a∥SAD≥f means sAD≤a or SAD≥f.

Preferably, after determining a second brightness value, the method further comprises:

determining, as a third brightness value, a brightness value for which a SAD corresponding to the brightness value and the first brightness value is the minimum, in brightness parameters of a third image displayed at a third time, the third time is a time next the first time;

determining, as a fourth brightness value, a brightness value for which a SAD corresponding to the brightness value and the first brightness value is the minimum, in brightness parameters of a fourth image displayed at a fourth time, the fourth time is a time next the third time;

determining a first variance between the target SAD and a first adjusted SAD, the first adjusted SAD is a SAD corresponding to the first brightness value and the third brightness value;

determining a second variance among the target SAD, the first adjusted SAD and a second adjusted SAD, the second adjusted SAD is a SAD corresponding to the first brightness value and the fourth brightness value;

comparing the second variance with the first variance;

if the second variance is greater than the first variance, adjusting values of a and f so as to reduce a and increase f; and if the second variance is smaller than the first variance, adjusting values of c and d so as to increase c and reduce d.

Preferably, determining the second brightness value may further comprise:

grouping a plurality of pixels of a display screen into n blocks, each block having the same numbers of pixels in rows (A) and columns (B), wherein n is an integer greater than 0;

determining a SAD corresponding to the first brightness value and a detected brightness value based on the first brightness value, the first coordinate and the brightness parameters at the second time, the detected brightness value is a brightness value in the brightness parameters at the second time and corresponds to a coordinate of a pixel in a first block of the n blocks;

determining the brightness value for which a SAD corresponding to the brightness value and the first brightness value is the minimum, in brightness parameters at the second time, as the second brightness value;

wherein the SAD corresponding to the first brightness value and a detected brightness value is determined as follows:

$$SAD_{(u,v)} = \sum_{i=0}^{A-1} \sum_{j=0}^{B-1} |f_t(i,j) - f_{t-1}(i+u, j+v)|,$$

A indicates the number of rows of the pixels in the first block, B indicates the number of columns of the pixels in the first block, wherein A and B are both integers greater than 1; (i+u, j+v) indicates a coordinate on a display screen obtained by shifting the first coordinate by u units horizontally and by v units vertically, $f_t(i, j)$ indicates the first brightness value; and $f_{t-1}(i+u, j+v)$ indicates the brightness value corresponding to the coordinate (i+u, j+v) in the brightness parameters at the second time.

Preferably, determining the motion compensation parameter corresponding to the first coordinate and the median frame interpolation parameter corresponding to the first coordinate may further comprise:

determining the motion compensation parameter corresponding to the first coordinate based on the first coordinate, the first brightness value and the second brightness value;

determining the median frame interpolation parameter corresponding to the first coordinate based on the first coordinate and the brightness parameters at the second time;

wherein the brightness compensation parameter is determined as follows:

$$f_{move}(i,j) = f_t\left(i - \frac{k}{2}, j - \frac{s}{2}\right), \text{ or, } f_{move}(i,j) = f_{t-1}\left(i + \frac{k}{2}, j + \frac{s}{2}\right),$$

wherein k indicates an average of a row coordinate of the first coordinate and a row coordinate of the coordinate corresponding to the second brightness value; s indicates an average of a column coordinate of the first coordinate and a column coordinate of the coordinate corresponding to the second brightness value;

$$f_t\left(i - \frac{k}{2}, j - \frac{s}{2}\right)$$

indicates the brightness parameters including the first brightness value and the coordinate $$\left(i - \frac{k}{2}, j - \frac{s}{2}\right); \text{ and } f_{t-1}\left(i + \frac{k}{2}, j + \frac{s}{2}\right)$$

is the brightness parameters including the second brightness value and the coordinate $$\left(i + \frac{k}{2}, j + \frac{s}{2}\right);$$

wherein the median frame interpolation parameter corresponding to a first coordinate is determined as follows:

$$f_{int}(i,j) = \frac{[f_t(i,j) + f_{t-1}(i,j)]}{2},$$

wherein $f_t(i, j)$ is the first brightness value, and $f_{t-1}(i, j)$ is a brightness value corresponding to a coordinate of the first coordinate, in the brightness parameters at the second time.

According to a second aspect of embodiments of the present disclosure, an image compensation apparatus is provided, and the apparatus may include:

a first determining module, configured to determine, as a second brightness value, a brightness value for which a Sum of Absolute Difference (SAD) corresponding to the brightness value and a first brightness value is the minimum, in brightness parameters of a second image displayed at a second time, the first brightness value is a brightness value in brightness parameters of a first image displayed at a first time and the second time is a time previous the first time;

a second determining module, configured to determine a membership degree corresponding to a target SAD, wherein the target SAD is a SAD corresponding to the first brightness value and the second brightness value;

a third determining module, configured to determine a motion compensation parameter corresponding to a first coordinate and a median frame interpolation parameter corresponding to the first coordinate, wherein the first coordinate is a coordinate corresponding to the first brightness value in the brightness parameters at the first time;

a fourth determining module, configured to determine a brightness compensation parameter corresponding to the first coordinate based on the membership degree corresponding to the target SAD, the motion compensation parameter corresponding to the first coordinate and the median frame interpolation parameter corresponding to the first coordinate;

a compensation module, configured to perform an image compensation so as to display a compensated image at a time between the second time and the first time based on the brightness compensation parameter corresponding to the first coordinate;

wherein the brightness compensation parameter is determined as follows:

$$f_{ins}(i,j) = u * f_{move}(i,j) + (1-u) * f_{int}(i,j),$$

wherein u indicates the membership degree corresponding to the target SAD, (i, j) indicates the first coordinate, $f_{ins}(i, j)$ indicates the brightness compensation parameter corresponding to the first coordinate, $f_{move}(i, j)$ indicates the motion compensation parameter corresponding to the first coordinate; and $f_{int}(i, j)$ indicates the median frame interpolation parameter corresponding to the first coordinate.

Preferably, the second determining module is configured to:

compare the target SAD with preset threshold parameters;
determine the membership degree corresponding to the target SAD according to the comparison result,
wherein the membership degree corresponding to the target SAD is determined as follows:

$$u = \begin{cases} 0 & (SAD \leq a \| SAD \geq f) \\ \dfrac{[SAD-a]^2}{(b-a)(c-a)} & (a \leq SAD \leq b) \\ 1 - \dfrac{[SAD-c]^2}{(c-b)(c-a)} & (b \leq SAD \leq c) \\ 1 & (c \leq SAD \leq d) \\ \dfrac{[a-SAD]^2}{(b-a)(c-a)} & (d \leq SAD \leq e) \\ 1 - \dfrac{[c-SAD]^2}{(c-b)(c-a)} & (e \leq SAD \leq f) \end{cases},$$

wherein u indicates the membership degree corresponding to the target SAD; a, b, c, d, e and f indicate the preset threshold parameters respectively, in which $a<b<c<d<e<f$; and $SAD \leq a \| SAD \geq f$ means $SAD \leq a$ or $SAD \geq f$.

Preferably, the image compensation apparatus may further include:

a fifth determining module, configured to determine, as a third brightness value, a brightness value for which a SAD corresponding to the brightness value and the first brightness value is the minimum, in brightness parameters of a third image displayed at a third time, the third time is a time next the first time;

a sixth determining module, configured to determine, as a fourth brightness value, a brightness value for which a SAD corresponding to the brightness value and the first brightness value is the minimum, in brightness parameters of a fourth image displayed at a fourth time, the fourth time is a time next the third time;

a seventh determining module, configured to determine a first variance between the target SAD and a first adjusted SAD, the first adjusted SAD is a SAD corresponding to the first brightness value and the third brightness value;

an eighth determining module, configured to determine a second variance among the target SAD, the first adjusted SAD and a second adjusted SAD, the second adjusted SAD is a SAD corresponding to the first brightness value and the fourth brightness value;

a comparison module, configured to compare the second variance with the first variance;

a first adjusting module, configured to adjust values of a and f so as to reduce a and increase f, if the second variance is greater than the first variance; and a second adjusting module, configured to adjust values of c and d so as to increase c and reduce d, if the second variance is smaller than the first variance.

Preferably, the first determining module is configured to:

group a plurality of pixels of a display screen into n blocks, each blocks having the same numbers of pixels in rows (A) and columns (B), wherein n is an integer greater than 0;

determine a SAD corresponding to the first brightness value and a detected brightness value based on the first brightness value, the first coordinate and the brightness parameters at the second time, the detected brightness value is a brightness value in the brightness parameters at the second time and corresponds to a coordinate of a pixel in a first block of the n blocks;

determine the brightness value for which a SAD corresponding to the brightness value and the first brightness value is the minimum, in brightness parameters at the second time, as the second brightness value;

wherein the SAD corresponding to the first brightness value and the detected brightness value is determined as follows:

$$SAD_{(u,v)} = \sum_{i=0}^{A-1} \sum_{j=0}^{B-1} |f_t(i, j) - f_{t-1}(i+u, j+v)|,$$

A indicates the number of rows of the pixels in the first block, B indicates the number of columns of the pixels in the first block, wherein A and B are both integers greater than 1; (i+u, j+v) indicates a coordinate on a display screen obtained by shifting the first coordinate by u units horizontally and by v units vertically, $f_t(i, j)$ indicates the first brightness value;

and $f_{t-1}(i+u, j+v)$ indicates the brightness value corresponding to the coordinate (i+u, j+v) in the brightness parameters at the second time.

Preferably, the third determining module is configured to:

determine the motion compensation parameter corresponding to the first coordinate based on the first coordinate, the first brightness value and the second brightness value;

determine the median frame interpolation parameter corresponding to the first coordinate based on the first coordinate and the brightness parameters at the second time;

wherein the brightness compensation parameter is determined as follows:

$$f_{move}(i, j) = f_t\left(i - \frac{k}{2}, j - \frac{s}{2}\right), \text{ or, } f_{move}(i, j) = f_{t-1}\left(i + \frac{k}{2}, j + \frac{s}{2}\right),$$

k indicates an average of a row coordinate of the first coordinate and a row coordinate of the coordinate corresponding to the second brightness value; s indicates an average of a column coordinate of the first coordinate and a column coordinate of the coordinate corresponding to the second brightness value;

$$f_t\left(i - \frac{k}{2}, j - \frac{s}{2}\right)$$

indicates the brightness parameters including the first brightness value and the coordinate $$\left(i - \frac{k}{2}, j - \frac{s}{2}\right); \text{ and } f_{t-1}\left(i + \frac{k}{2}, j + \frac{s}{2}\right)$$

is the brightness parameters including the second brightness value and the coordinate $$\left(i + \frac{k}{2}, j + \frac{s}{2}\right);$$

wherein the median frame interpolation parameter corresponding to a first coordinate is determined as follows:

$$f_{int}(i, j) = \frac{[f_t(i, j) + f_{t-1}(i, j)]}{2},$$

$f_t(i, j)$ is the first brightness value, and $f_{t-1}(i, j)$ is a brightness value corresponding to a coordinate of the first coordinate, in the brightness parameters at the second time.

BRIEF DESCRIPTION OF THE DRAWINGS

In order to illustrate the technical solutions of the embodiment of the present disclosure or the prior art, the accompany figures will be simply introduced. It is obvious that the following figures only show some embodiments of the present disclosure and those skilled in the art may obtain other figures according to these figures without any inventive labors.

The embodiments of the present disclosure are discussed with reference to the drawings, wherein the description thereof will be discussed in details. These drawings and description thereof are used merely to describe an inventive concept of the disclosure and are not intended to limit the present disclosure.

DETAILED DESCRIPTION

The above and other objects, features, and advantages of the present disclosure will become apparent from the following descriptions on embodiments of the present disclosure with reference to the drawings.

Figure 1:
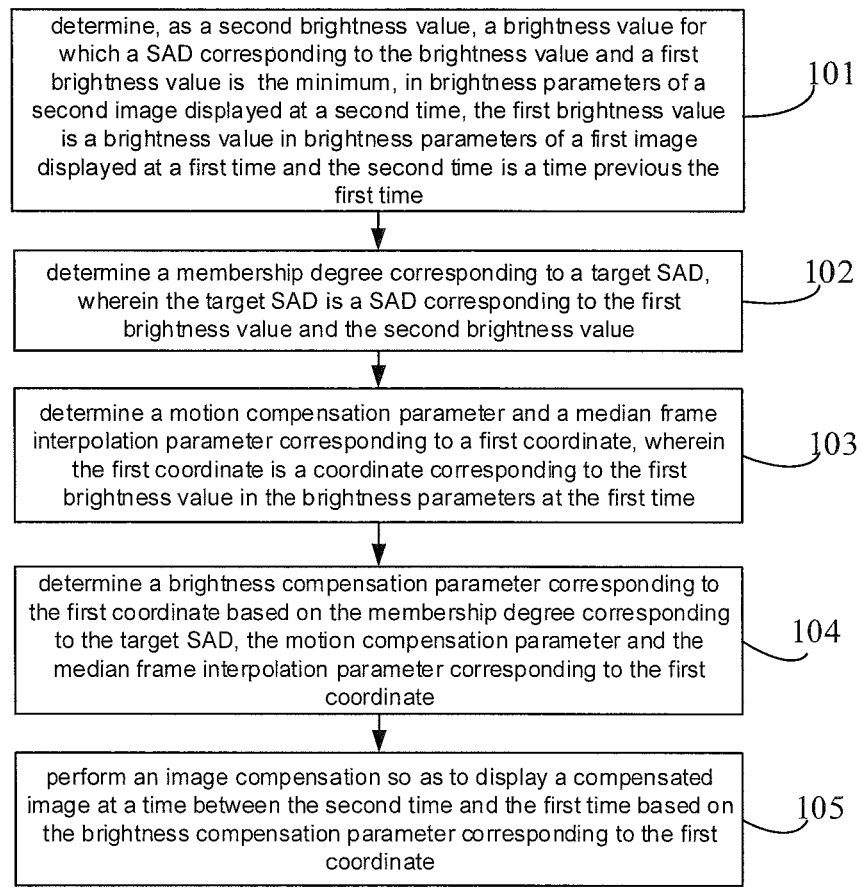
FIG. 1 is a flow diagram of an image compensation method according to an embodiment of the disclosure.

According to an embodiment of the disclosure, an image compensation method is provided. As shown in FIG. 1, the image compensation method may include:

in step 101, determining, as a second brightness value, a brightness value for which a SAD corresponding to the brightness value and a first brightness value is the minimum, in brightness parameters of a second image displayed at a second time, the first brightness value is a brightness value in brightness parameters of a first image displayed at a first time and the second time is a time previous the first time;

In step 102, a membership degree corresponding to a target SAD is determined, wherein the target SAD is a SAD corresponding to the first brightness value and the second brightness value.

In step 103, a motion compensation parameter corresponding to a first coordinate and a median frame interpolation parameter corresponding to the first coordinate are determined, wherein the first coordinate is a coordinate corresponding to the first brightness value in the brightness parameters at the first time.

In step 104, a brightness compensation parameter corresponding to the first coordinate is determined based on the membership degree corresponding to the target SAD, the motion compensation parameter corresponding to the first coordinate and the median frame interpolation parameter corresponding to the first coordinate.

In step 105, an image compensation is performed so as to display a compensated image at a time between the second time and the first time, based on the brightness compensation parameter corresponding to the first coordinate.

The brightness compensation parameter can be determined as follows:

$$f_{ins}(i,j)=u*f_{move}(i,j)+(1-u)*f_{int}(i,j),$$

wherein u indicates the membership degree corresponding to the target SAD, (i, j) indicates the first coordinate, $f_{ins}(i, j)$ indicates the brightness compensation parameter corresponding to the first coordinate, $f_{move}(i, j)$ indicates the motion compensation parameter corresponding to the first coordinate; and $f_{int}(i, j)$ indicates the median frame interpolation parameter corresponding to the first coordinate.

In view of above, in the image compensation method according to the embodiment of the disclosure, the membership degree is firstly determined based on a SAD corresponding to the first and the second brightness values, and then ratios of the motion compensation parameter and the median frame interpolation parameter occupying in the process of calculating the brightness compensation parameter is determined based on the membership degree. Since the median frame interpolation parameter is a part of the brightness compensation parameter, the part occupied by the motion compensation parameter is decreased. The brightness compensation value and the coordinate corresponding to it are both unique in the median frame interpolation parameter, which means that there is no error in the median frame interpolation parameter, reducing an error in the brightness compensation parameter and improving an effect on brightness compensation.

Preferably, the step 102 may include:

comparing the target SAD with preset threshold parameters;

determining the membership degree corresponding to the target SAD according to the comparison result, wherein the membership degree corresponding to the target SAD may be determined as follows:

$$u = \begin{cases} 0 & (SAD \leq a || SAD \geq f) \\ \frac{[SAD - a]^2}{(b-a)(c-a)} & (a \leq SAD \leq b) \\ 1 - \frac{[SAD - c]^2}{(c-b)(c-a)} & (b \leq SAD \leq c) \\ 1 & (c \leq SAD \leq d) \\ \frac{[a - SAD]^2}{(b-a)(c-a)} & (d \leq SAD \leq e) \\ 1 - \frac{[c - SAD]^2}{(c-b)(c-a)} & (e \leq SAD \leq f) \end{cases},$$

wherein u indicates the membership degree corresponding to the target SAD; a, b, c, d, e and f indicate the preset threshold parameters respectively, in which a<b<c<d<e<f; and SAD≤a||SAD≥f means SAD≤a or SAD≥f.

After the step 101, the image compensation method may further include:

determining, as a third brightness value, a brightness value for which a SAD corresponding to the brightness value and the first brightness value is the minimum, in brightness parameters of a third image displayed at a third time, the third time is a time next the first time;

determining, as a fourth brightness value, a brightness value for which a SAD corresponding to the brightness value and the first brightness value is the minimum, in brightness parameters of a fourth image displayed at a fourth time, the fourth time is a time next the third time;

determining a first variance between the target SAD and a first adjusted SAD, the first adjusted SAD is a SAD corresponding to the first brightness value and the third brightness value;

determining a second variance among the target SAD, the first adjusted SAD and a second adjusted SAD, the second adjusted SAD is a SAD corresponding to the first brightness value and the fourth brightness value;

comparing the second variance with the first variance;

if the second variance is greater than the first variance, adjusting values of a and f so as to reduce a and increase f; and if the second variance is smaller than the first variance, adjusting values of c and d so as to increase c and reduce d.

For example, the step 101 may include:

grouping a plurality of pixels of a display screen into n blocks, each block having the same numbers of pixels in rows (A) and columns (B), wherein n is an integer greater than 0;

determining a SAD corresponding to the first brightness value and a detected brightness value based on the first brightness value, the first coordinate and the brightness parameters at the second time, the detected brightness value is a brightness value in the brightness parameters at the second time and corresponds to a coordinate of a pixel in a first block of the n blocks;

determining the brightness value for which a SAD corresponding to the brightness value and the first brightness value is the minimum, in brightness parameters at the second time, as the second brightness value;

wherein the SAD corresponding to the first brightness value and a detected brightness value may be determined as follows:

$$SAD_{(u,v)} = \sum_{i=0}^{A-1} \sum_{j=0}^{B-1} |f_t(i, j) - f_{t-1}(i+u, j+v)|.$$

A indicates the number of rows of the pixels in the first block, B indicates the number of columns of the pixels in the first block, wherein A and B are both integers greater than 1; (i+u, j+v) indicates a coordinate on a display screen obtained by shifting the first coordinate by u units horizontally and by v units vertically, $f_t(i, j)$ indicates the first brightness value; and $f_{t-1}(i+u, j+v)$ indicates the brightness value corresponding to the coordinate (i+u, j+v) in the brightness parameters at the second time.

Preferably, the step 103 may include:

determining the motion compensation parameter corresponding to the first coordinate based on the first coordinate, the first brightness value and the second brightness value;

determining the median frame interpolation parameter corresponding to the first coordinate based on the first coordinate and the brightness parameters at the second time;

wherein the brightness compensation parameter may be determined as follows:

$$f_{move}(i, j) = f_t\left(i - \frac{k}{2}, j - \frac{s}{2}\right),$$

or, $$f_{move}(i, j) = f_{t-1}\left(i + \frac{k}{2}, j + \frac{s}{2}\right),$$

wherein k indicates an average of a row coordinate of the first coordinate and a row coordinate of the coordinate corresponding to the second brightness value; s indicates an average of a column coordinate of the first coordinate and a column coordinate of the coordinate corresponding to the second brightness value;

$$f_t\left(i - \frac{k}{2}, j - \frac{s}{2}\right)$$

indicates the brightness parameters including the first brightness value and the coordinate $$\left(i - \frac{k}{2}, j - \frac{s}{2}\right);$$

and $$f_{t-1}\left(i + \frac{k}{2}, j + \frac{s}{2}\right)$$

is the brightness parameters including the second brightness value and the coordinate $$\left(i + \frac{k}{2}, j + \frac{s}{2}\right);$$

wherein the median frame interpolation parameter corresponding to a first coordinate may be determined as follows:

$$f_{int}(i, j) = \frac{[f_t(i, j) + f_{t-1}(i, j)]}{2},$$

wherein $f_t(i, j)$ is the first brightness value, and $f_{t-1}(i, j)$ is a brightness value corresponding to a coordinate of the first coordinate, in the brightness parameters at the second time.

Figure 2:
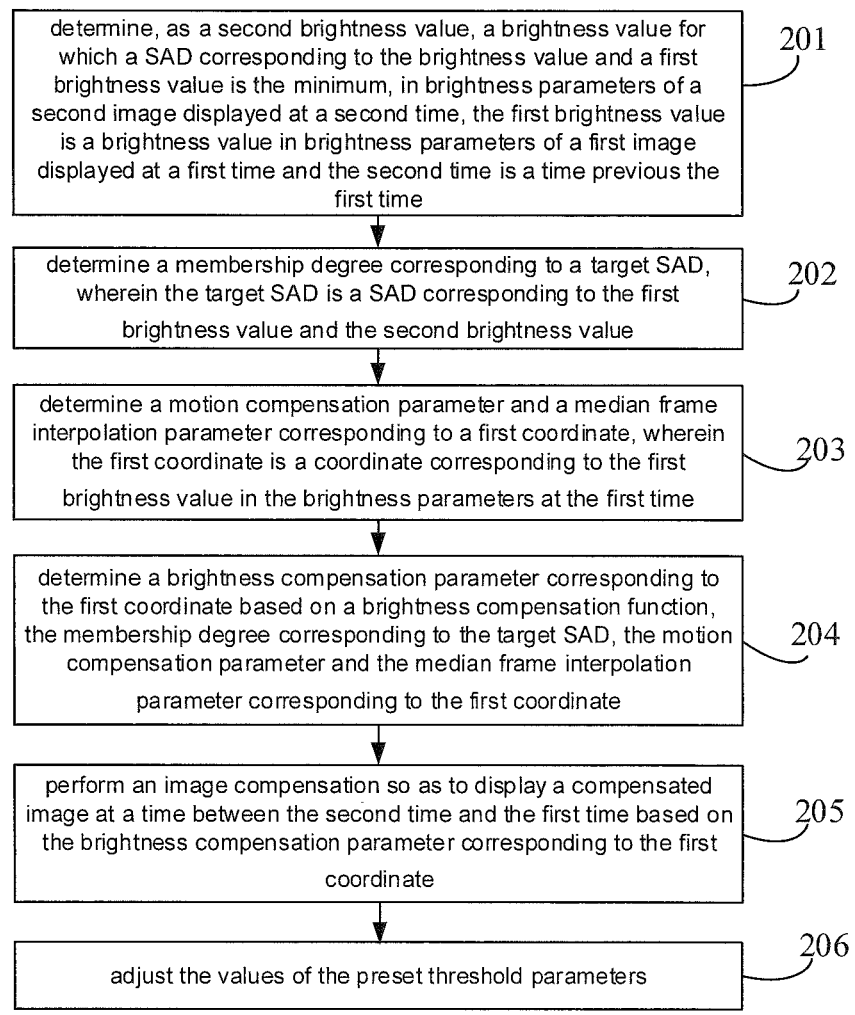
FIG. 2 is a flow diagram of an image compensation method according to another embodiment of the disclosure.

According to another embodiment of the present disclosure, an image compensation method is provided. As shown in FIG. 2, the image compensation method may include:

in step 201, determining, as a second brightness value, a brightness value for which a SAD corresponding to the brightness value and a first brightness value is the minimum, in brightness parameters of a second image displayed at a second time, the first brightness value is a brightness value in brightness parameters of a first image displayed at a first time and the second time is a time previous the first time.

Figure 3:
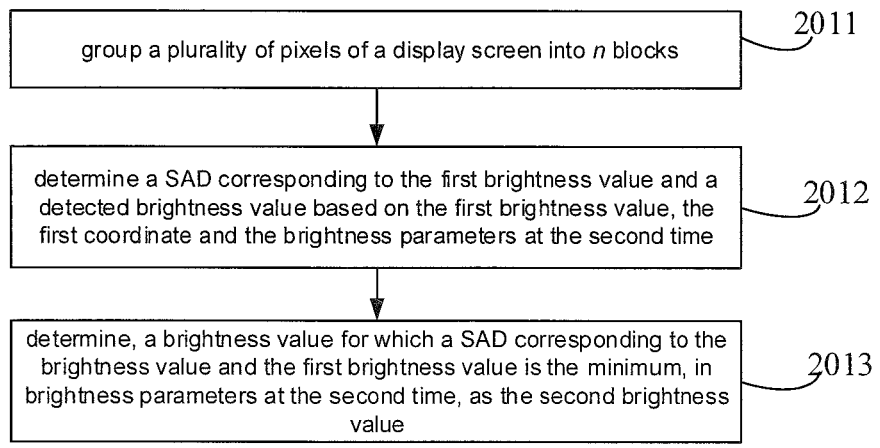
FIG. 3 is a flow diagram of a method for determining a second brightness value according to an embodiment of the disclosure.

As shown in FIG. 3, the step 201 may include:

in step 2011, grouping a plurality of pixels of a display screen into n blocks.

Figure 4:
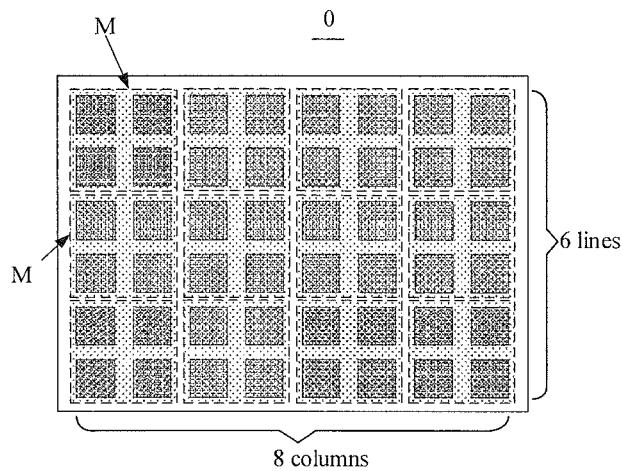
FIG. 4 is a schematic diagram of a display screen according to an embodiment of the disclosure.

For example, the plurality of pixels are arranged in a matrix. After grouping the plurality of pixels into n blocks, each block has the same numbers of pixels in rows (A) and columns (B), i.e. each block has the same numbers of pixels as others, wherein n is an integer greater than 0. As shown in FIG. 4, there are 48 pixels on the display screen 0. The 48 pixels are arranged in a matrix of 6 rows and 8 columns, and can be grouped into 12 blocks (represented by M), wherein each block M may include 4 pixels. It should be noted that FIG. 4 is only an example of one of embodiments of the disclosure. The pixels of the display screen can be grouped into more blocks or fewer blocks, and the number of the blocks is not defined in the disclosure.

In step 2012, a SAD corresponding to the first brightness value and a detected brightness value is determined based on the first brightness value, the first coordinate and the brightness parameters at the second time.

Preferably, the brightness parameters at the first time may include a coordinate of each pixel on the display screen and a corresponding brightness value of the pixel, wherein the coordinate and the brightness value of the pixel corresponds with each other in the brightness parameters. At the first time, the display apparatus may control a brightness value of respective pixel to be equal to the brightness value corresponding to the coordinate of the pixel in the brightness parameters at the first time, according to the brightness parameters at the first time, such that the display screen may display the first image at the first time. Furthermore, the brightness parameters at the second time may include a coordinate of each pixel on the display screen and a corresponding brightness value of the pixel, wherein the coordinate and the brightness value of the pixel corresponds with each other in the brightness parameters. At the second time, the display apparatus may control a brightness value of respective pixel to be equal to the brightness value corresponding to the coordinate of the pixel in the brightness parameters at the second time, according to the brightness parameters at the second time, such that the display screen may display the second image at the second time.

It should be noted that the second time is a time previous the first time, and the first brightness value is a brightness value in brightness parameters at the first time. The detected brightness value is a brightness value in the brightness parameters at the second time and corresponds to a coordinate of a pixel in a first block of the n blocks. The specific procedure of determining a SAD corresponding to the first brightness value and a detected brightness value based on the first brightness value, the first coordinate and the brightness parameters at the second time has been discussed in the prior art for determining a SAD corresponding to two brightness values, and thus it will not be discussed in details.

For example, the SAD corresponding to the first brightness value and the detected brightness value may be determined as follows:

$$SAD_{(u,v)} = \sum_{i=0}^{A-1} \sum_{j=0}^{B-1} |f_t(i, j) - f_{t-1}(i + u, j + v)|,$$

A indicates the number of rows of the pixels in the first block, B indicates the number of columns of the pixels in the first block; (i+u, j+v) indicates a coordinate on a display screen obtained by shifting the first coordinate by u units horizontally and by v units vertically, $f_t(i, j)$ indicates the first brightness value; and $f_{t-1}(i+u, j+v)$ indicates the brightness value corresponding to the coordinate (i+u, j+v) in the brightness parameters at the second time.

In step 2013, a brightness value for which a SAD corresponding to the brightness value and the first brightness value is the minimum, in brightness parameters at the second time, is determined as the second brightness value.

After determining the SADs corresponding to the first brightness value and a detected brightness value, a brightness value for which a SAD corresponding to the brightness value and the first brightness value is the minimum among those SADs, is determined as the second brightness value. It should be noted that SAD can indicate a similarity between two brightness values, in particular, the smaller a SAD is, the greater the similarity becomes. Since the SAD corresponds to the first brightness value and the second brightness value is the minimum in the brightness parameters at the second time, these two brightness values are most similar.

In step 202, a membership degree corresponding to a target SAD is determined, wherein the target SAD is a SAD corresponding to the first brightness value and the second brightness value.

Although the determination of a membership degree corresponding to a target SAD based on the target SAD and preset threshold parameters is illustrated in the disclosure, the membership degree corresponding to a target SAD may be determined by using other methods.

Figure 5:
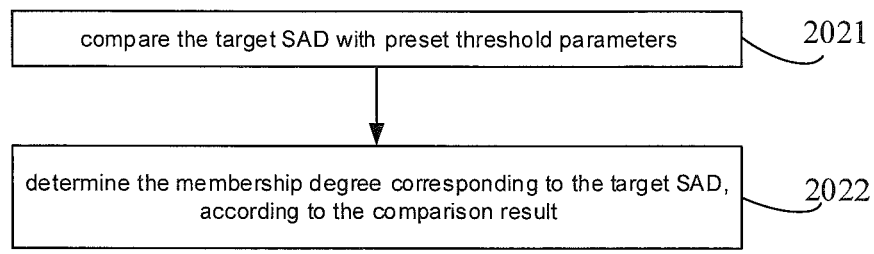
FIG. 5 is a flow diagram of a method for determining a membership degree according to an embodiment of the disclosure.

As shown in FIG. 5, the step 202 may include:

in step 2021, comparing the target SAD with preset threshold parameters.

For example, the target SAD is a SAD corresponding to the first and the second brightness values. Since in step 201, a brightness value for which a SAD corresponding to the first brightness value and the brightness value is the minimum, in the brightness parameters at the second time, is determined as the second brightness value, a SAD corresponding to the first brightness value and the second brightness value can be determined as the target SAD. Preferably, there may be a plurality of threshold parameters and n the target SAD can be compared with each of the threshold parameters.

In step 2022, the membership degree corresponding to the target SAD is determined according to the comparison result.

Preferably, the preset threshold parameters may be a, b, c, d, e and f. If the comparison result in step 2021 is the target SAD≤a or the target SAD≥f, the membership degree corresponding to the target SAD is determined as u=0; if the comparison result in step 2021 is a≤the target SAD≤b, the membership degree is determined as $$u = \frac{[SAD-c]^2}{(b-a)(c-a)};$$

if the comparison result in step 2021 is b≤the target SAD≤c, the membership degree is determined as $$u = 1 - \frac{[SAD-c]^2}{(c-b)(c-a)};$$

if the comparison result in step 2021 is c≤the target SAD≤d, the membership degree is determined as u=1; if the comparison result in step 2021 is d≤the target SAD≤e, the membership degree is determined as $$u = \frac{[a-SAD]^2}{(b-a)(c-a)};$$

and if the comparison result in step 2021 is e≤the target SAD≤f, the membership degree is determined as $$u = 1 - \frac{[c-SAD]^2}{(c-b)(c-a)}.$$

For example, the membership degree corresponding to the target SAD may be determined as follows:

$$u = \begin{cases} 0 & (SAD \leq a \| SAD \geq f) \\ \frac{[SAD-a]^2}{(b-a)(c-a)} & (a \leq SAD \leq b) \\ 1 - \frac{[SAD-c]^2}{(c-b)(c-a)} & (b \leq SAD \leq c) \\ 1 & (c \leq SAD \leq d) \\ \frac{[a-SAD]^2}{(b-a)(c-a)} & (d \leq SAD \leq e) \\ 1 - \frac{[c-SAD]^2}{(c-b)(c-a)} & (e \leq SAD \leq f) \end{cases},$$

wherein u indicates the membership degree corresponding to the target SAD; a, b, c, d, e and f indicate the preset threshold parameters respectively, in which a<b<c<d<e<f; and SAD≤a∥SAD≥f means SAD≤a or SAD≥f.

In step 203, a motion compensation parameter corresponding to a first coordinate and a median frame interpolation parameter corresponding to the first coordinate may be determined, wherein the first coordinate is a coordinate corresponding to the first brightness value in the brightness parameters at the first time.

According to an aspect of embodiments of the disclosure, the motion compensation parameter corresponding to the first coordinate can be determined based on the first coordinate, the first brightness value and the second brightness value, as follows:

$$f_{move}(i, j) = f_t\left(i - \frac{k}{2}, j - \frac{s}{2}\right), \text{ or, } f_{move}(i, j) = f_{t-1}\left(i + \frac{k}{2}, j + \frac{s}{2}\right),$$

k indicates an average of a row coordinate of the first coordinate and a row coordinate of the coordinate corresponding to the second brightness value; s indicates an average of a column coordinate of the first coordinate and a column coordinate of the coordinate corresponding to the second brightness value;

$$f_t\left(i - \frac{k}{2}, j - \frac{s}{2}\right)$$

indicates the brightness parameters including the first brightness value and the coordinate $$\left(i - \frac{k}{2}, j - \frac{s}{2}\right); \text{ and } f_{t-1}\left(i + \frac{k}{2}, j + \frac{s}{2}\right)$$

is the brightness parameters including the second brightness value and the coordinate $$\left(i + \frac{k}{2}, j + \frac{s}{2}\right).$$

For example, if the first coordinate is (1, 2), the coordinate corresponding to the second brightness value is (1, 4), and the first brightness value is G, an average k of a row coordinate of the first coordinate and a row coordinate of the coordinate corresponding to the second brightness value can be determined as 1, and an average s of a column coordinate of the first coordinate and a column coordinate of the coordinate corresponding to the second brightness value can be determined as 3. Thus, the motion compensation parameter corresponding to the first coordinate can be derived according to the above equation, and may include a coordinate of a pixel which located at (1, 3) and its brightness value G.

In another aspect, the median frame interpolation parameter corresponding to the first coordinate may be determined based on the first coordinate and the brightness parameters at the second time:

$$f_{int}(i, j) = \frac{[f_t(i, j) + f_{t-1}(i, j)]}{2},$$

wherein $f_t(i, j)$ is the first brightness value, $f_{t-1}(i, j)$ is a brightness value corresponding to a coordinate of the first coordinate, in the brightness parameters at the second time.

For example, it is assumed that the first coordinate is (1, 2), the brightness value corresponding to the first coordinate is G, a coordinate corresponding to a coordinate of the first coordinate in the brightness parameters at the second time is (1, 2), and a brightness value corresponding to a coordinate (1, 2) of the first coordinate in the brightness parameters at the second time is J. Thus, the median frame interpolation parameter corresponding to the first coordinate can be derived according to the above equation, and may include a coordinate of a pixel which located at (1, 2) and its brightness value $$\frac{G + J}{2}.$$

In step 204, a brightness compensation parameter corresponding to the first coordinate is determined based on the membership degree corresponding to the target SAD, the motion compensation parameter corresponding to the first coordinate and the median frame interpolation parameter corresponding to the first coordinate.

Preferably, after determining the motion compensation parameter corresponding to the first coordinate and the median frame interpolation parameter corresponding to the first coordinate in step 203 and determining the membership degree corresponding to the target SAD in step 202, in step 204, the brightness compensation parameter corresponding to the first coordinate may be determined based on the motion compensation parameter, the median frame interpolation parameter and the membership degree:

$$f_{ins}(i,j)=u*f_{move}(i,j)+(1-u)*f_{int}(i,j),$$

wherein u indicates the membership degree corresponding to the target SAD, (i, j) indicates the first coordinate, $f_{ins}(i, j)$ indicates the brightness compensation parameter corresponding to the first coordinate, $f_{move}(i, j)$ indicates the motion compensation parameter corresponding to the first coordinate; and $f_{int}(i, j)$ indicates the median frame interpolation parameter corresponding to the first coordinate.

In step 205, an image compensation is performed so as to display a compensated image at a time between the second time and the first time, based on the brightness compensation parameter corresponding to the first coordinate.

For example, after determining the brightness compensation parameter corresponding to the first coordinate, at a midpoint time of the first time and the second time, the display apparatus may control a brightness value of a pixel to be equal to the brightness value corresponding the coordinate of the pixel on the display screen in the brightness compensation parameter, according to the brightness compensation parameter, such that the display screen can display an image displayed at the midpoint time, compensating the images displayed at the first time and the second time.

In step 206, the values of the preset threshold parameters can be adjusted.

It should be noted that after step 201, a brightness value for which a SAD corresponding to the brightness value and a first brightness value is the minimum, in brightness parameters of a third image displayed at a third time may be further determined as a third brightness value, and a brightness value for which a SAD corresponding to the brightness value and a first brightness value is the minimum, in brightness parameters of a fourth image displayed at a fourth time may be further determined as a fourth brightness value. The third time is a time after the first time, and the fourth time is a time after the third time. A SAD corresponding to the first brightness value and the third brightness value is a first adjusted SAD, a SAD corresponding to the first brightness value and the fourth brightness value is a second adjusted SAD. A first variance between the target SAD and the first adjusted SAD is determined, and a second variance among the target SAD, the first adjusted SAD and the second adjusted SAD is determined. Then, the first variance and the second variance are compared with each other. If the second variance is greater than the first variance, adjust the values of a and f, so as to reduce a and increase f; and if the second variance is smaller than the first variance, adjust the values of c and d, so as to increase c and reduce d.

If the image displayed at the first time and the image displayed at the second time are very similar with each other, there may be a plurality of brightness values for which SAD corresponding to the respective brightness value and the first brightness value is the minimum, i.e. there may be a plurality of target SADs. In this case, since the target SAD is small and it is less than the smallest parameter a of the threshold parameters, the membership degree corresponding to a target SAD which is determined based on the target SAD should be determined as 0. By combining with the above equation for calculating the brightness compensation parameter, it may lead to $f_{ins}(i, j)=f_{int}(i, j)$, which means that the brightness compensation parameter can be determined regardless the motion compensation parameter, but only associated with the median frame interpolation parameter. Since the brightness compensation value and the corresponding coordinate are both unique in the median frame interpolation parameter (which means that the median frame interpolation parameter has no error), it may lead to reduce an error in the brightness compensation parameter and to improve an effect on brightness compensation.

It should be noted that the sequence of steps of the image compensation method according to embodiments of the disclosure can be appropriately adjusted. Some steps can be omitted or additional other steps may be further included. It will be understood by those skilled in the art that various changes in form and details may be made therein without departing from the example embodiments of the present disclosure as defined by the appended claims.

Figure 6:
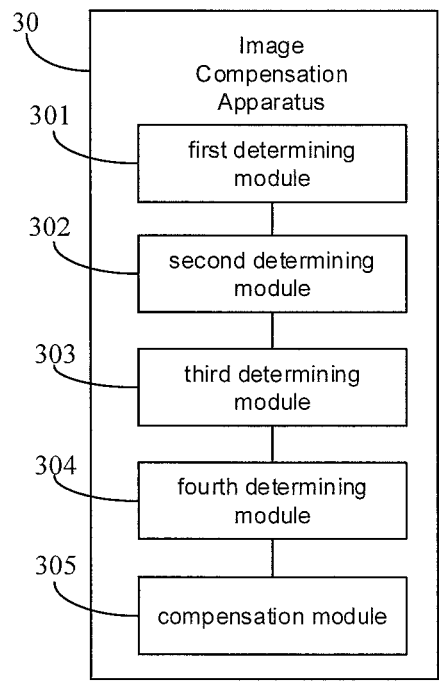
FIG. 6 is a schematic diagram of an image compensation apparatus according to an embodiment of the disclosure.

As shown in FIG. 6, according to an embodiment of the present disclosure, an image compensation apparatus 30 is provided, and the apparatus 30 may include:

a first determining module 301, configured to determine, as a second brightness value, a brightness value for which a SAD corresponding to the brightness value and a first brightness value is the minimum, in brightness parameters of a second image displayed at a second time, the first brightness value is a brightness value in brightness parameters of a first image displayed at a first time and the second time is a time previous the first time;

a second determining module 302, configured to determine a membership degree corresponding to a target SAD, wherein the target SAD is a SAD corresponding to the first brightness value and the second brightness value;

a third determining module 303, configured to determine a motion compensation parameter corresponding to a first coordinate and a median frame interpolation parameter corresponding to the first coordinate, wherein the first coordinate is a coordinate corresponding to the first brightness value in the brightness parameters at the first time;

a fourth determining module 304, configured to determine a brightness compensation parameter corresponding to the first coordinate based on the membership degree corresponding to the target SAD, the motion compensation parameter corresponding to the first coordinate and the median frame interpolation parameter corresponding to the first coordinate;

a compensation module 305, configured to perform an image compensation so as to display a compensated image at a time between the second time and the first time based on the brightness compensation parameter corresponding to the first coordinate.

The brightness compensation parameter may be determined as follows:

$$f_{ins}(i,j) = u * f_{move}(i,j) + (1-u) * f_{int}(i,j),$$

wherein u indicates the membership degree corresponding to the target SAD, (i, j) indicates the first coordinate, $f_{ins}(i, j)$ indicates the brightness compensation parameter corresponding to the first coordinate, $f_{move}(i, j)$ indicates the motion compensation parameter corresponding to the first coordinate; and $f_{int}(i, j)$ indicates the median frame interpolation parameter corresponding to the first coordinate.

In view of above, in the image compensation apparatus according to the embodiment of the present disclosure, the second determining module may determine the membership degree based on a SAD corresponding to the first brightness value and the second brightness value, and the fourth determining module may determine ratios of the motion compensation parameter and the median frame interpolation parameter occupying in the process of calculating the brightness compensation parameter based on the membership degree. Since the median frame interpolation parameter is a part of the brightness compensation parameter, the part occupied by the motion compensation parameter is decreased. The brightness compensation value and the corresponding coordinate are both unique in the median frame interpolation parameter, which means that there is no error in the median frame interpolation parameter, reducing an error in the brightness compensation parameter and improving an effect on brightness compensation.

Preferably, the second determining module 302 can be configured to:

compare the target SAD with preset threshold parameters;

determine the membership degree corresponding to the target SAD according to the comparison result, wherein the membership degree corresponding to the target SAD may be determined as follows:

$$u = \begin{cases} 0 & (SAD \leq a \| SAD \geq f) \\ \frac{[SAD-a]^2}{(b-a)(c-a)} & (a \leq SAD \leq b) \\ 1 - \frac{[SAD-c]^2}{(c-b)(c-a)} & (b \leq SAD \leq c) \\ 1 & (c \leq SAD \leq d) \\ \frac{[a-SAD]^2}{(b-a)(c-a)} & (d \leq SAD \leq e) \\ 1 - \frac{[c-SAD]^2}{(c-b)(c-a)} & (e \leq SAD \leq f) \end{cases},$$

wherein u indicates the membership degree corresponding to the target SAD; a, b, c, d, e and f indicate the preset threshold parameters respectively, in which a<b<c<d<e<f; and SAD≤a∥SAD≥f means SAD≤a or SAD≥f.

Figure 7:
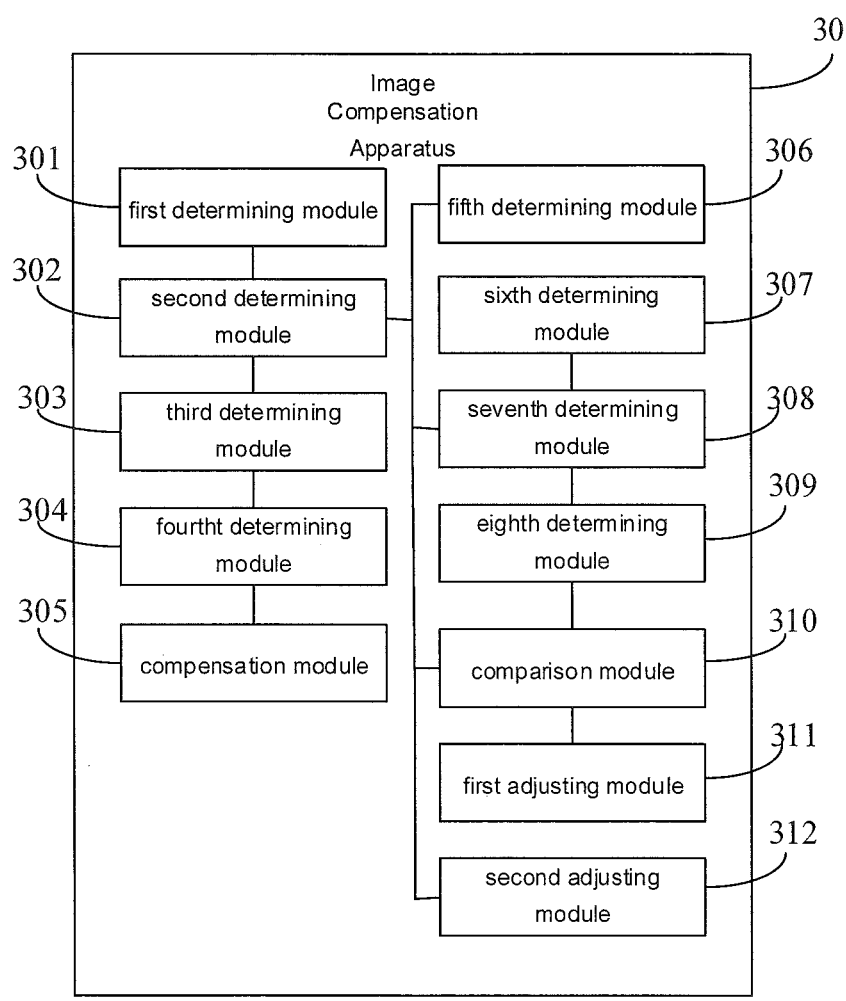
FIG. 7 is a schematic diagram of an image compensation apparatus according to another embodiment of the disclosure.

As shown in FIG. 7, according to an embodiment of the present disclosure, an image compensation apparatus 30 is provided, and the apparatus 30 may include:

a first determining module 301, configured to determine, as a second brightness value, a brightness value for which a SAD corresponding to the brightness value and a first brightness value is the minimum, in brightness parameters of a second image displayed at a second time, the first brightness value is a brightness value in brightness parameters of a first image displayed at a first time and the second time is a time previous the first time;

a second determining module 302 configured to determine a membership degree corresponding to a target SAD, wherein the target SAD is a SAD corresponding to the first brightness value and the second brightness value;

a third determining module 303 configured to determine a motion compensation parameter corresponding to a first coordinate and a median frame interpolation parameter corresponding to the first coordinate, wherein the first coordinate is a coordinate corresponding to the first brightness value in the brightness parameters at the first time;

a fourth determining module 304 configured to determine a brightness compensation parameter corresponding to the first coordinate based on the membership degree corresponding to the target SAD, the motion compensation parameter corresponding to the first coordinate and the median frame interpolation parameter corresponding to the first coordinate;

a compensation module 305, configured to perform an image compensation so as to display a compensated image at a time between the second time and the first time based on the brightness compensation parameter corresponding to the first coordinate;

a fifth determining module 306, configured to determine, as a third brightness value, a brightness value for which a SAD corresponding to the brightness value and the first brightness value is the minimum, in brightness parameters of a third image displayed at a third time, the third time is a time next the first time;

a sixth determining module 307, configured to determine, as a fourth brightness value, a brightness value for which a SAD corresponding to the brightness value and the first brightness value is the minimum, in brightness parameters of a fourth image displayed at a fourth time, the fourth time is a time next the third time;

a seventh determining module 308, configured to determine a first variance between the target SAD and a first adjusted SAD, the first adjusted SAD is a SAD corresponding to the first brightness value and the third brightness value;

an eighth determining module 309, configured to determine a second variance among the target SAD, the first adjusted SAD and a second adjusted SAD, the second adjusted SAD is a SAD corresponding to the first brightness value and the fourth brightness value;

a comparison module 310, configured to compare the second variance with the first variance;

a first adjusting module 311, configured to adjust the values of a and f so as to reduce a and increase f, if the second variance is greater than the first variance; and a second adjusting module 312, configured to adjust the values of c and d so as to increase c and reduce d, if the second variance is smaller than the first variance.

The brightness compensation parameter may be determined as follows:

$$f_{ins}(i,j) = u * f_{move}(i,j) + (1-u) * f_{int}(i,j),$$

wherein u indicates the membership degree corresponding to the target SAD, (i, j) indicates the first coordinate, $f_{ins}(i, j)$ indicates the brightness compensation parameter corresponding to the first coordinate, $f_{move}(i, j)$ indicates the motion compensation parameter corresponding to the first coordinate; and $f_{int}(i, j)$ indicates the median frame interpolation parameter corresponding to the first coordinate.

Preferably, the first determining module 301 can be configured to:

group a plurality of pixels into n blocks, each block having the same numbers of pixels in rows (A) and columns (B), wherein n is an integer greater than 0;

determine a SAD corresponding to the first brightness value and a detected brightness value based on the first brightness value, the first coordinate and the brightness parameters at the second time, the detected brightness value is a brightness value in the brightness parameters at the second time and corresponds to a coordinate of a pixel in a first block of the n blocks;

determine, as the second brightness value, the brightness value for which a SAD corresponding to the brightness value and the first brightness value is the minimum, in brightness parameters at the second time;

wherein the SAD corresponding to the first brightness value and the detected brightness value may be determined as follows:

$$SAD_{(u,v)} = \sum_{j=0}^{A-1} \sum_{j=0}^{B-1} |f_t(i, j) - f_{t-1}(i+u, j+v)|,$$

A indicates the number of rows of the pixels in the first block, B indicates the number of columns of the pixels in the first block; (i+u, j+v) indicates a coordinate on a display screen obtained by shifting the first coordinate by u units horizontally and by v units vertically, $f_t(i, j)$ indicates the first brightness value; and $f_{t-1}(i+u, j+v)$ indicates the brightness value corresponding to the coordinate (i+u, j+v) in the brightness parameters at the second time.

Preferably, the third determining module 303 can be configured to:

determine the motion compensation parameter corresponding to the first coordinate based on the first coordinate, the first brightness value and the second brightness value;

determine the median frame interpolation parameter corresponding to the first coordinate based on the first coordinate and the brightness parameters at the second time;

wherein the motion compensation parameter may be determined as follows:

$$f_{move}(i, j) = f_t\left(i - \frac{k}{2}, j - \frac{s}{2}\right), \text{ or, } f_{move}(i, j) = f_{t-1}\left(i + \frac{k}{2}, j + \frac{s}{2}\right),$$

wherein k indicates an average of a row coordinate of the first coordinate and a row coordinate of the coordinate corresponding to the second brightness value; s indicates an average of a column coordinate of the first coordinate and a column coordinate of the coordinate corresponding to the second brightness value;

$$f_t\left(i - \frac{k}{2}, j - \frac{s}{2}\right)$$

indicates the brightness parameters including the first brightness value and the coordinate $$\left(i - \frac{k}{2}, j - \frac{s}{2}\right); \text{ and } f_{t-1}\left(i + \frac{k}{2}, j + \frac{s}{2}\right)$$

is the brightness parameters including the second brightness value and the coordinate $$\left(i + \frac{k}{2}, j + \frac{s}{2}\right);$$

wherein the median frame interpolation parameter may be determined as follows:

$$f_{int}(i, j) = \frac{[f_t(i, j) + f_{t-1}(i, j)]}{2},$$

wherein $f_t(i, j)$ is the first brightness value, $f_{t-1}(i, j)$ is a brightness value corresponding a coordinate of the first coordinate, in the brightness parameters at the second time.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. An image compensation method comprising:
    determining, as a second brightness value, a brightness value for which a Sum of Absolute Difference (SAD) corresponding to the brightness value and a first brightness value is the minimum, in brightness parameters of a second image displayed at a second time, the first brightness value is a brightness value in brightness parameters of a first image displayed at a first time and the second time is a time previous the first time;
    determining a membership degree corresponding to a target SAD, wherein the target SAD is a SAD corresponding to the first brightness value and the second brightness value;
    determining a motion compensation parameter corresponding to a first coordinate and a median frame interpolation parameter corresponding to the first coordinate, wherein the first coordinate is a coordinate corresponding to the first brightness value in the brightness parameters of the first image displayed at the first time;
    determining a brightness compensation parameter corresponding to the first coordinate based on the membership degree corresponding to the target SAD, the motion compensation parameter corresponding to the first coordinate and the median frame interpolation parameter corresponding to the first coordinate;
    performing an image compensation so as to display a compensated image at a time between the second time and the first time based on the brightness compensation parameter corresponding to the first coordinate;
    wherein the brightness compensation parameter is determined as follows:

$f_{ins}(i, j)=u*f_{move}(i, j)+(1-u)*f_{int}(i, j)$, u indicates the membership degree corresponding to the target SAD, (i, j) indicates the first coordinate, $f_{ins}(i, j)$ indicates the brightness compensation parameter corresponding to the first coordinate, $f_{move}(i, j)$ indicates the motion compensation parameter corresponding to the first coordinate; and $f_{int}(i, j)$ indicates the median frame interpolation parameter corresponding to the first coordinate.

2. The method of claim 1, wherein determining the membership degree corresponding to a target SAD further comprises:
    comparing the target SAD with preset threshold parameters;
    determining the membership degree corresponding to the target SAD according to the comparison result;
    wherein the membership degree corresponding to the target SAD is determined as follows:

$$u = \begin{cases} 0 & (SAD \le a \| SAD \ge f) \\ \frac{[SAD-a]^2}{(b-a)(c-a)} & (a \le SAD \le b) \\ 1 - \frac{[SAD-c]^2}{(c-b)(c-a)} & (b \le SAD \le c) \\ 1 & (c \le SAD \le d) \\ \frac{[a-SAD]^2}{(b-a)(c-a)} & (d \le SAD \le e) \\ 1 - \frac{[c-SAD]^2}{(c-b)(c-a)} & (e \le SAD \le f) \end{cases},$$

wherein u indicates the membership degree corresponding to the target SAD; a, b, c, d, e and f indicate the preset threshold parameters respectively, in which a<b<c<d<e<f; and SAD≤a||SAD≥f means SAD≤a or SAD≥f.

3. The method of claim 2, wherein after determining the second brightness value, the method further comprises:
    determining, as a third brightness value, a brightness value for which a SAD corresponding to the brightness value and the first brightness value is the minimum, in brightness parameters of a third image displayed at a third time, the third time is a time next the first time;
    determining, as a fourth brightness value, a brightness value for which a SAD corresponding to the brightness value and the first brightness value is the minimum, in brightness parameters of a fourth image displayed at a fourth time, the fourth time is a time next the third time;
    determining a first variance between the target SAD and a first adjusted SAD, the first adjusted SAD is a SAD corresponding to the first brightness value and the third brightness value;
    determining a second variance among the target SAD, the first adjusted SAD and a second adjusted SAD, the second adjusted SAD is a SAD corresponding to the first brightness value and the fourth brightness value;
    comparing the second variance with the first variance;
    if the second variance is greater than the first variance, adjusting the values of a and f so as to reduce a and increase f; and
    if the second variance is smaller than the first variance, adjusting the values of c and d so as to increase c and reduce d.

4. The method of claim 3, wherein determining the second brightness value further comprises:
    grouping a plurality of pixels of a display screen into n blocks, each block having the same numbers of pixels in rows and columns, wherein n is an integer greater than 0;
    determining a SAD corresponding to the first brightness value and a detected brightness value based on the first brightness value, the first coordinate and the brightness parameters of the second images displayed at the second time, the detected brightness value is a brightness value in the brightness parameters of the second images displayed at the second time and corresponds to a coordinate of a pixel in a first block of the n blocks;

determining the brightness value for which a SAD corresponding to the brightness value and the first brightness value is the minimum, in brightness parameters of the second image displayed at the second time, as the second brightness value;

wherein the SAD corresponding to the first brightness value and a detected brightness value is determined as follows:

$$SAD_{(u,v)} = \sum_{i=0}^{A-1}\sum_{j=0}^{B-1} |f_t(i, j) - f_{t-1}(i+u, j+v)|,$$

A indicates the number of rows of the pixels in the first block, B indicates the number of columns of the pixels in the first block, wherein A and B are both integers greater than 1; (i+u, j+v) indicates a coordinate on a display screen obtained by shifting the first coordinate by u units horizontally and by v units vertically, $f_t(i, j)$ indicates the first brightness value; and $f_{t-1}(i+u, j+v)$ indicates the brightness value corresponding to the coordinate (i+u, j+v) in the brightness parameters of the second images displayed at the second time.

5. The method of claim 1, wherein determining the motion compensation parameter corresponding to the first coordinate and the median frame interpolation parameter corresponding to the first coordinate further comprises:

determining the motion compensation parameter corresponding to the first coordinate based on the first coordinate, the first brightness value and the second brightness value;

determining the median frame interpolation parameter corresponding to the first coordinate based on the first coordinate and the brightness parameters of the second image displayed at the second time;

wherein the motion compensation parameter is determined as follows:

$$f_{move}(i, j) = f_t\left(i - \frac{k}{2}, j - \frac{s}{2}\right), \text{ or, } f_{move}(i, j) = f_{t-1}\left(i + \frac{k}{2}, j + \frac{s}{2}\right),$$

wherein k indicates an average of a row coordinate of the first coordinate and a row coordinate of the coordinate corresponding to the second brightness value; s indicates an average of a column coordinate of the first coordinate and a column coordinate of the coordinate corresponding to the second brightness value;

$$f_t\left(i - \frac{k}{2}, j - \frac{s}{2}\right)$$

indicates the brightness parameters including the first brightness value and the coordinate $$\left(i - \frac{k}{2}, j - \frac{s}{2}\right); \text{ and } f_{t-1}\left(i + \frac{k}{2}, j + \frac{s}{2}\right)$$

is the brightness parameters including the second brightness value and the coordinate $$\left(i + \frac{k}{2}, j + \frac{s}{2}\right);$$

wherein the median frame interpolation parameter corresponding to a first coordinate is determined as follows:

$$f_{int}(i, j) = \frac{[f_t(i, j) + f_{t-1}(i, j)]}{2},$$

wherein $f_t(i, j)$ is the first brightness value, and $f_{t-1}(i, j)$ is a brightness value corresponding a coordinate of the first coordinate, in the brightness parameters of the second image displayed at the second time.

6. An image compensation apparatus comprising:

a first determining module, configured to determine, as a second brightness value, a brightness value for which a Sum of Absolute Difference (SAD) corresponding to the brightness value and a first brightness value is the minimum, in brightness parameters of a second image displayed at a second time, the first brightness value is a brightness value in brightness parameters of a first image displayed at a first time and the second time is a time previous the first time;

a second determining module, configured to determine a membership degree corresponding to a target SAD, wherein the target SAD is a SAD corresponding to the first brightness value and the second brightness value;

a third determining module, configured to determine a motion compensation parameter corresponding to a first coordinate and a median frame interpolation parameter corresponding to the first coordinate, wherein the first coordinate is a coordinate corresponding to the first brightness value in the brightness parameters of the first image displayed at the first time;

a fourth determining module, configured to determine a brightness compensation parameter corresponding to the first coordinate based on the membership degree corresponding to the target SAD, the motion compensation parameter corresponding to the first coordinate and the median frame interpolation parameter corresponding to the first coordinate;

a compensation module, configured to perform an image compensation so as to display a compensated image at a time between the second time and the first time based on the brightness compensation parameter corresponding to the first coordinate;

wherein the brightness compensation parameter is determined as follows:

$$f_{ins}(i, j) = u * f_{move}(i, j) + (1-u) * f_{int}(i, j),$$

wherein u indicates the membership degree corresponding to the target SAD, (i, j) indicates the first coordinate, $f_{ins}(i, j)$ indicates the brightness compensation parameter corresponding to the first coordinate, $f_{move}(i, j)$ indicates the motion compensation parameter corresponding to the first coordinate; and $f_{int}(i, j)$ indicates the median frame interpolation parameter corresponding to the first coordinate.

7. The apparatus of claim 6, wherein the second determining module is further configured to:

compare the target SAD with preset threshold parameters;

determine the membership degree corresponding to the target SAD according to the comparison result;

wherein the membership degree corresponding to the target SAD is determined as follows:

$$u = \begin{cases} 0 & (SAD \leq a \,\|\, SAD \geq f) \\ \dfrac{[SAD-a]^2}{(b-a)(c-a)} & (a \leq SAD \leq b) \\ 1 - \dfrac{[SAD-c]^2}{(c-b)(c-a)} & (b \leq SAD \leq c) \\ 1 & (c \leq SAD \leq d) \\ \dfrac{[a-SAD]^2}{(b-a)(c-a)} & (d \leq SAD \leq e) \\ 1 - \dfrac{[c-SAD]^2}{(c-b)(c-a)} & (e \leq SAD \leq f) \end{cases}$$

wherein u indicates the membership degree corresponding to the target SAD; a, b, c, d, e and f indicate the preset threshold parameters respectively, in which a<b<c<d<e<f; and SAD≤a||SAD≥f means SAD≤a or SAD≥f.

8. The apparatus of claim 7, wherein the image compensation apparatus further includes:
a fifth determining module, configured to determine, as a third brightness value, a brightness value for which a SAD corresponding to the brightness value and the first brightness value is the minimum, in brightness parameters of a third image displayed at a third time, the third time is a time next the first time;
a sixth determining module, configured to determine, as a fourth brightness value, a brightness value for which a SAD corresponding to the brightness value and the first brightness value is the minimum, in brightness parameters of a fourth image displayed at a fourth time, the fourth time is a time next the third time;
a seventh determining module, configured to determine a first variance between the target SAD and a first adjusted SAD, the first adjusted SAD is a SAD corresponding to the first brightness value and the third brightness value;
an eighth determining module, configured to determine a second variance among the target SAD, the first adjusted SAD and a second adjusted SAD, the second adjusted SAD is a SAD corresponding to the first brightness value and the fourth brightness value;
a comparison module, configured to compare the second variance with the first variance;
a first adjusting module, configured to adjust the values of a and f so as to reduce a and increase f, if the second variance is greater than the first variance; and
a second adjusting module, configured to adjust the values of c and d so as to increase c and reduce d, if the second variance is smaller than the first variance.

9. The apparatus of claim 8, wherein the first determining module is further configured to:
group a plurality of pixels into n blocks, each blocks having the same numbers of pixels in rows (A) and columns (B), wherein n is an integer greater than 0;
determine a SAD corresponding to the first brightness value and a detected brightness value based on the first brightness value, the first coordinate and the brightness parameters of the second images displayed at the second time, the detected brightness value is a brightness value in the brightness parameters of the second images displayed at the second time and corresponds to a coordinate of a pixel in a first block of the n blocks;
determine the brightness value for which a SAD corresponding to the brightness value and the first brightness value is the minimum, in brightness parameters of the second image displayed at the second time, as the second brightness value;
wherein the SAD corresponding to the first brightness value and the detected brightness value is determined as follows:

$$SAD_{(u,v)} = \sum_{i=0}^{A-1} \sum_{j=0}^{B-1} |f_t(i,j) - f_{t-1}(i+u, j+v)|,$$

wherein A indicates the number of rows of the pixels in the first block, B indicates the number of columns of the pixels in the first block, wherein A and B are both integers greater than 1; (i+u, j+v) indicates a coordinate on a display screen obtained by shifting the first coordinate by u units horizontally and by v units vertically, $f_t(i, j)$ indicates the first brightness value; and $f_{t-1}(i+u, j+v)$ indicates the brightness value corresponding to the coordinate (i+u, j+v) in the brightness parameters of the second images displayed at the second time.

10. The apparatus of claim 6, wherein the third determining module is further configured to:
determine the motion compensation parameter corresponding to the first coordinate based on the first coordinate, the first brightness value and the second brightness value;
determine the median frame interpolation parameter corresponding to the first coordinate based on the first coordinate and the brightness parameters of the second image displayed at the second time;
wherein the motion compensation parameter is determined as follows:

$$f_{move}(i,j) = f_t\left(i - \frac{k}{2}, j - \frac{s}{2}\right), \text{ or, } f_{move}(i,j) = f_{t-1}\left(i + \frac{k}{2}, j + \frac{s}{2}\right),$$

k indicates an average of a row coordinate of the first coordinate and a row coordinate of the coordinate corresponding to the second brightness value; s indicates an average of a column coordinate of the first coordinate and a column coordinate of the coordinate corresponding to the second brightness value;

$$f_t\left(i - \frac{k}{2}, j - \frac{s}{2}\right)$$

indicates the brightness parameters including the first brightness value and the coordinate $$\left(i - \frac{k}{2}, j - \frac{s}{2}\right); \text{ and } f_{t-1}\left(i + \frac{k}{2}, j + \frac{s}{2}\right)$$

is the brightness parameters including the second brightness value and the coordinate $$\left(i+\frac{k}{2},\ j+\frac{s}{2}\right);$$

wherein the median frame interpolation parameter is determined as follows:

$$f_{int}(i,\ j) = \frac{[f_t(i,\ j) + f_{t-1}(i,\ j)]}{2},$$

$f_t(i, j)$ is the first brightness value, and $f_{t-1}(i, j)$ is a brightness value corresponding a coordinate of the first coordinate, in the brightness parameters of the second image displayed at the second time.

* * * * *